United States Patent
Staples et al.

(10) Patent No.: US 12,342,818 B2
(45) Date of Patent: Jul. 1, 2025

(54) FORMULATIONS AND METHODS FOR CONTROLLING INVASIVE AMPHIBIANS

(71) Applicant: Animal Control Technologies (Australia) Pty Ltd, Somerton (AU)

(72) Inventors: Linton Staples, Somerton (AU); Michael Oelgemoeller, Townsville (AU); Lin Schwarzkopf, Townsville (AU)

(73) Assignee: Animal Control Technologies (Australia) Pty Ltd, Somerton Victoria (AU)

( * ) Notice: Subject to any disclaimer, the term of this patent is extended or adjusted under 35 U.S.C. 154(b) by 731 days.

(21) Appl. No.: 17/618,931

(22) PCT Filed: Jun. 18, 2020

(86) PCT No.: PCT/AU2020/050616
§ 371 (c)(1),
(2) Date: Dec. 14, 2021

(87) PCT Pub. No.: WO2020/252530
PCT Pub. Date: Dec. 24, 2020

(65) Prior Publication Data
US 2022/0256846 A1    Aug. 18, 2022

(30) Foreign Application Priority Data
Jun. 18, 2019    (AU) .................. 2019902117

(51) Int. Cl.
*A01N 39/00*    (2006.01)
*A01N 25/04*    (2006.01)
*A01P 15/00*    (2006.01)

(52) U.S. Cl.
CPC ............. *A01N 39/00* (2013.01); *A01N 25/04* (2013.01); *A01P 15/00* (2021.08)

(58) Field of Classification Search
CPC .......... A01N 39/00; A01N 25/04; A01P 15/00
See application file for complete search history.

(56) References Cited

U.S. PATENT DOCUMENTS 7,334,538 B1 *    2/2008    Kuhns ................... A61K 47/32
                                                                                 119/231
2010/0069506 A1    3/2010    Dall et al.

FOREIGN PATENT DOCUMENTS

| AU | 2014201934 B | 10/2014 |
|----|---|---|
| CN | 104938529 | 9/2015 |
| JP | H06256106 | 9/1994 |
| JP | 2008-222696 | 9/2008 |
| KR | 101192980 B | 10/2012 |

OTHER PUBLICATIONS

International Search Report and Written Opinion for International Application No. PCT/AU2020/050616, dated Jul. 22, 2020, 10 pages.
Akbary, P., et al., "Analysis of Primary and Secondary Stress Responses in Bighead Carp (*Hypophthalmichthys nobilis*) by Anesthetization with 2-phenoxyethanol," Int. J. Environ. Sci. Technol., (2016), vol. 13, pp. 1009-1016.
Sharp, T., et al., "Methods for the field euthanasia of cane toads," (2011), pp. 13-15, 17, URL: http://www.environment.gov.au/biodiversity/invasive-species/publications/can001-methods-field-euthanasia-cane-toads.

* cited by examiner

*Primary Examiner* — Zohreh A Fay
(74) *Attorney, Agent, or Firm* — Finnegan, Henderson, Farabow, Garrett & Dunner, LLP

(57) ABSTRACT

The present invention relates to formulations and methods for humanely controlling invasive amphibian populations, and in particular the cane toad, comprising 2-phenoxyethanol and ethanol and/or isopropanol as carrier.

13 Claims, 1 Drawing Sheet

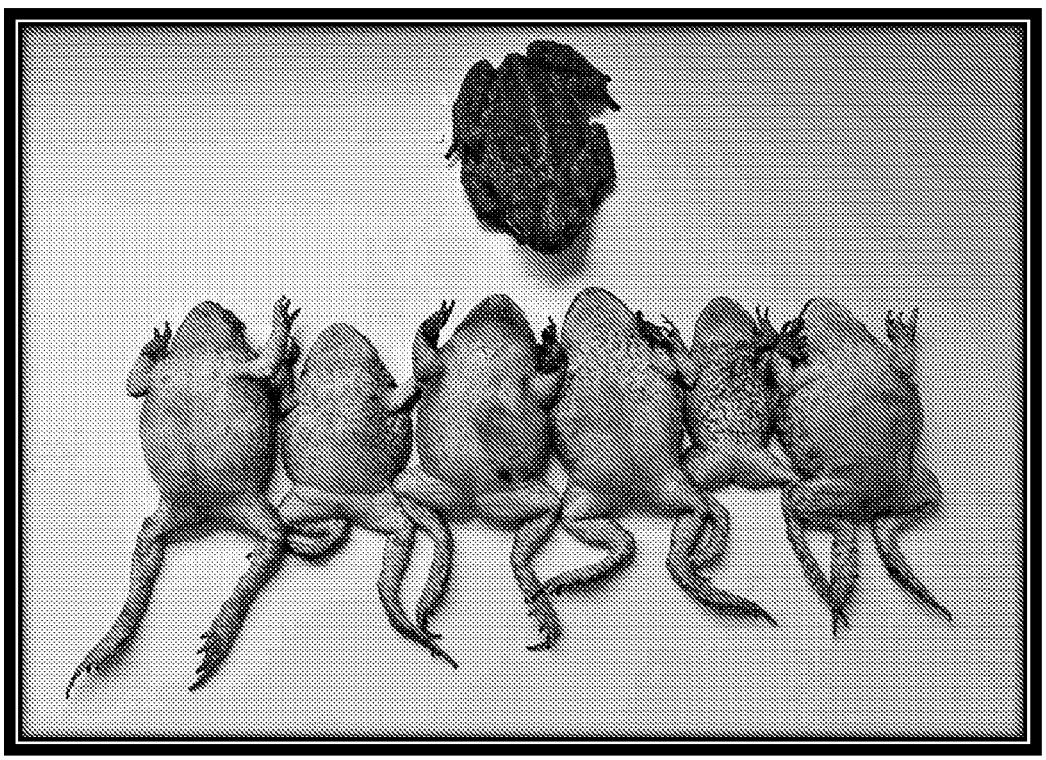

FORMULATIONS AND METHODS FOR CONTROLLING INVASIVE AMPHIBIANS

This application is the United States national stage entry under 35 U.S.C. § 371 of International Application No. PCT/AU2020/050616, filed on Jun. 18, 2020, which claims priority to Australian Patent Application No. 2019902117, filed on Jun. 18, 2019. The contents of these applications are each incorporated herein by reference in their entirety.

FIELD

The present invention relates to formulations and methods for humanely controlling invasive amphibian populations, and in particular the cane toad.

BACKGROUND

Many amphibian species are on the decline, while at the same time, a growing number of species have invaded new habitats and have reached population levels that have had negative consequences on native flora and fauna, agriculture, and local economies. Examples include introduced species of frogs and toads such as the Coqui Frog (introduced into Hawaii), Cane Toad (introduced into, inter alia, Australia from Central America to control the sugar cane beetle), Bullfrogs (introduced into the western side of US and Hawaii from the east as a food source) and Asian Black-Spined Toads (*Duttaphrynus melanostictus*) (introduced into Australia from Asia). These and other invasive amphibians generally have a high reproductive rate, which facilitates rapid population growth and are able to easily recovery and thrive in extreme weather and environmental events. They have generalized diets that effectively utilize locally abundant resources which is often harmful to agricultural crops and native fauna. They are also adept at undetected movement which allows the development of incipient populations that are difficult to detect until the population is well established.

Cane toads (*Rhinella marina*), which are native to South America, are pervasive species in many northern parts of Australia and are slowly working their way to the southern states. They were widely introduced in Australia (around 1935) from Hawaii into sugar cane producing regions to control the sugar cane beetles (grey-backed cane beetle and French's beetle) which were causing crop damage. Cane toad populations have grown enormously and now the toads successfully compete with native species for food, compete with native amphibians for breeding sites, and prey on a variety of invertebrate and vertebrate species In addition, native species and domestic pets preying on cane toads may be poisoned by the toad's parotoid glands. Toads are also a nuisance when large numbers congregate for breeding in ponds or water ways and may foul potable water sources. Australia has been aggressively pursuing control options but has had little success in developing effective methods. Currently, the only effective strategies are pond drying, hand or trap capture and killing.

There is a need for improved ways to control these invasive species and in particular, in a manner which controls such species humanely.

SUMMARY

The present inventors have found that specific non-aqueous or substantially non-aqueous formulations of 2-phenoxyethanol are effective in controlling invasive amphibian species (such as the cane toad) when applied to said animals, and in particular when applied to the dorsal and/or ventral surfaces of said animal.

Accordingly in an aspect the present invention provides a non-aqueous or substantially non-aqueous formulation comprising 2-phenoxyethanol at a concentration greater than 40 g/L, and a carrier selected from ethanol and/or isopropanol.

In another aspect, the invention also provides a method of humanely controlling an invasive amphibian population including the step of applying to at least one member of said population a non-aqueous or substantially non-aqueous formulation comprising 2-phenoxyethanol at a concentration greater than 40 g/L, and a carrier selected from ethanol and/or isopropanol.

BRIEF DESCRIPTION OF FIGURES

FIG. 1 shows one healthy control toad and six experimental toads 15 minutes after testing.

DETAILED DESCRIPTION OF THE INVENTION

The formulations of the invention are "non-aqueous" or substantially non-aqueous in nature. That is, it is contemplated that the formulations comprise essentially no water or less than about 5% water (w/v), such as less than about 4% water, less than about 3% water, less than about 2% water or less than about 1% water.

After testing many different types of potential toxicants (in different carriers), such as benzocaine, sodium nitrite, tricaine mesylate, and sodium monesnsin, the present inventors identified 2-phenoxyethanol as the only real effective candidate. Yet, the testing has shown that formulations of 2-phenoxyethanol with water as a carrier were not effective. The present inventors have however surprisingly discovered that the use of 2-phenoxyethanol at a concentration greater than 40 g/L in a carrier of either ethanol or isopropanol is an effective control of, for instance, toad populations.

As used herein, the term "amphibian" refers to animals of the class Amphibia. They are exothermic, tetrapod vertebrates with most species living in terrestrial, fossorial, arboreal, or freshwater aquatic ecosystems. The three modern orders of amphibians are Anura (the frogs and toads), Urodela (the salamanders) and Apoda (the caecilians).

In an embodiment the method is directed to the control of frogs and toads.

In an embodiment the method is directed to the control of toads.

In an embodiment the method is directed to the control of cane toads.

An advantage of the present formulations is that one can control the population in a humane manner. In particular, studies conducted by the present inventors have revealed that application of the formulation to individual members of a toad population effectively kills said toads within about an average of 15-60 minutes. The toads are generally unresponsive after about 15 minutes with no signs of inhumane suffering such as muscle rigidity, poison gland discharge or distress.

The formulations disclosed herein utilise 2-phenoxyethanol as a toxicant. 2-Phenoxyethanol is also known as "Phenoxyethanol", "ethylene glycol monophenyl ether", "phenoxytolarosol", "Dowanol EP/EPH", "Protectol PE", "Emery 6705", or "Rose ether". 2-Phenoxyethanol can be readily produced by the hydroethylation of phenol (Williamson synthesis) in the presence of an alkali-metal hydroxide or borohydride.

The effective concentrations are those that comprise greater than 40 g/L (of carrier) of 2-phenoxyethanol, such as greater than 50 g/L greater than 60 g/L, greater than 70 g/L, greater than 80 g/L, greater than 90 g/L, greater than 100 g/L, greater than 110 g/L, greater than 120 g/L, greater than 130 g/L, greater than 140 g/L, greater than 150 g/L, greater than 160 g/L, greater than 170 g/L, greater than 180 g/L, greater than 190 g/L, or greater than 200 g/L.

In certain embodiments the concentration range of 2-phenoxyethanol is from about 40 g/L to about 200 g/L.

In certain embodiments the concentration range of 2-phenoxyethanol is from about 50 g/L to about 200 g/L.

In certain embodiments the concentration range of 2-phenoxyethanol is from about 60 g/L to about 200 g/L.

In certain embodiments the concentration range of 2-phenoxyethanol is from about 70 g/L to about 200 g/L.

In certain embodiments the concentration range of 2-phenoxyethanol is from about 80 g/L to about 200 g/L.

The method of manufacturing said formulations may involve simply mixing together effective concentrations of 2-phenoxyethanol within quantities of the carrier.

In an embodiment of the formulation the carrier is ethanol.

In an embodiment of the formulation the carrier is isopropanol.

In an embodiment of the formulation the carrier is a mixture of ethanol and isopropanol.

In an embodiment the ethanol is food grade ethanol.

In an embodiment the ethanol is industrial grade ethanol.

In an embodiment the ethanol is anhydrous ethanol.

In an embodiment the method involves applying the formulation to the amphibian as a sprayable formulation. In an embodiment the amphibian is sprayed one to three times, such as one time, two times or three times, and in particular applied to them dorsally (on their backs) and/or ventrally (on their undersides).

In certain embodiments the formulations may include an amount of an additional toxicant selected from the group: eugenol, isoeugenol chloroxylenol, and clove oil. If these additional toxicants are utilised they are preferably added to the formulation at a concentration of between about 10 g/L to about 200 g/L, such as about 20 g/L, 30 g/L, 40 g/L, 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, or about 109 g/L (or any range within these figures).

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Further features of the present invention are more fully described in the following non-limiting examples.

EXAMPLES

Animals

Adult cane toads (*Rhinella marina*) (>90 cm SUL=snout-urostyle length) were collected around Townsville one or two nights prior to the trials. The toads were kept in two Nally bins with all males in one, and all females in the other for ease of sorting. Each trial used 6 toads—six treatment toads (three females and three males).

Trials

1. The compound and carrier controls were prepared on day of testing.
2. Toads were weighed, measured and placed in individual buckets and left for 10 minutes to settle.
3. 1.5 ml of the formulation or carrier or water was delivered to the ventral and/or dorsal surface of each toad via a spray bottle (2×1 ml sprays and accounting for approximately 0.5 ml loss during spraying).
4. Measurements of toad behaviour and heart rate were recorded at T=5, 10, 15, 20, 25, 30, 45, 60, 75, 90, 105, 120 minutes, plus 4-6 hours, 10-12 hours, 16-18 hours and 24 hours after spraying. If toads were still unconscious but not dead (if there was a heartbeat) within 24 hours, they were checked again at 48 hours. The following measurements were taken at each time interval:

Consciousness: Righting reflex was tested by flipping toads onto their backs and their ability to right themselves was recorded as "fast," "slow," or "unresponsive". Observations were made of the palpebral reflex and involuntary muscular movement: Palpebral reflex was tested by gently tapping the palpebral area with the finger and observing eyelid movement. Involuntary muscular movement was tested via the withdrawal reflex, by grasping each limb distally and extending it.

Breathing/heart rate (did the toad appear to be breathing or was there a detectable heart beat);

Side effects (any other noticeable effects of the formulation such as twitching, distress or agitation, poison gland discharge, muscle rigidity, gasping, or ventral redness).

Post-Trial

Even when no vital signs are detected externally during the experimental process, previous studies have shown that toads may appear dead and still have a heartbeat. At the completion of the trials, all animals were anaesthetised with a lethal dose MS222 (tricaine mesylate) then dissected to determine if the heart was still beating and to look for any signs of internal necrosis.

TABLE 1

Formulation Results and Comparative Test Formulations

| Compound | Carrier | Concentration | No. of sprays | Avg. Time to Unresponsive | Avg. Time Until Breathing & Heart Beat Not Detected | Mortality Rate | Number of Toads Tested | Length of Trial | Side effects | Comments |
| --- | --- | --- | --- | --- | --- | --- | --- | --- | --- | --- |
| 2-Phenoxyethanol | Isopropanol | 140 g/L | 2 DORSAL | 17.95 mins | 22.05 mins | 100% | 22 | 48 hrs | | |
| 2-Phenoxyethanol | Isopropanol | 126.3 g/L | 2 DORSAL | 18 mins | 24.25 mins | 95.8% | 24 | 48 hrs | | This was a repeat of the last trial, but with more toads. |
| 2-Phenoxyethanol | Isopropanol | 126.3 g/L | 2 DORSAL | 18.3 mins | 23 mins | 100% | 6 | 48 hrs | | |
| 2-phenoxyethanol | Ethanol | 168.36 g/L | 2 Ventral + dorsal | 13.33 mins | 20 mins | 100% | 6 | 48 hrs | Bloating, ventral redness | |
| 2-phenoxyethanol | Isopropanol | 168.36 g/L | 2 Ventral + dorsal | 11.67 mins | 14.17 mins | 100% | 6 | 48 hrs | Bloating, ventral redness | |
| 2-Phenoxyethanol | water | 168.36 g/L | 2 Ventral + dorsal | 14.166 mins | — | 0 | 6 | 48 hrs | Some bloating | |
| 2-Phenoxyethanol | Propylene glycol | 168.36 g/L | 2 Ventral + dorsal | 15.83 mins | — | 66.66 | 6 | 48 hrs | 1 toad made a 'chirrup' sound before going unconscious Some bloating | Propylene glycol is viscous, doesn't spray well |
| 2-phenoxyethanol | Ethanol | 84.2 g/L | 2 Ventral + dorsal | 15 mins | 405 mins | 100% | 6 | 48 hrs | Kicking motion when flipped over, before going unconscious. Bloating, Ventral pinkness | |
| 2-phenoxyethanol | Isopropanol | 84.2 g/L | 2 Ventral + dorsal | 16.67 mins | 40.83 mins | 100% | 6 | 48 hrs | Bloating, Ventral pinkness | |
| 2-phenoxyethanol | Ethanol | 21.05 g/L | 2 Ventral + dorsal | NA mins | NA | 0% | 6 | 48 hrs | Bloating, Ventral pinkness | |
| Control (isopropanol only) | Isopropanol | 100% | 2 Ventral + dorsal | NA | NA | 0% | 6 | 48 hrs | Kicking motion from a couple of toads | Reflexes greatly reduced for a few hours, but all toads recovered. |
| Control (propylene glycol only) | Propylene Glycol | 100% | 2 Ventral + dorsal | NA | NA | 0% | 6 | 48 hrs | — | Propylene glycol is viscous, doesn't spray well. |
| Control (ethanol only) | ethanol | 100% | 2 Ventral + dorsal | NA | NA | 0% | 6 | 48 hrs | — | |
| 2-Phenoxyethanol + Eugenol 1:1 | Isopropanol | 168.36 g/L 112 g/L | 2 Ventral + dorsal | 15.83 mins | 19.16 mins | 100% | 6 | 48 hrs | Bloating, Ventral pinkness | |
| 2-phenoxyethanol + Eugenol 1:1 | Ethanol | 168.36 g/L 112 g/L | 2 Ventral + dorsal | 12.5 mins | 18.33 mins | 100% | 6 | 48 hrs | Kicking motion when flipped over, before going unconscious | |
| 2-Phenoxyethanol + Eugenol 1:1 | Isopropanol | 84.2 g/L 59 g/L | 2 Ventral + dorsal | 15 mins | 17.5 mins | 100% | 6 | 48 hrs | Bloating, Ventral pinkness | |
| 2-phenoxyethanol + Eugenol 1:1 | Ethanol | 84.2 g/L 59 g/L | 2 Ventral + dorsal | 10.83 mins | 149.17 mins | 100% | 6 | 48 hrs | Kicking motion when flipped over, before going unconscious. | |

TABLE 1-continued

Formulation Results and Comparative Test Formulations

| Compound | Carrier | Concentration | No. of sprays | Avg. Time to Unresponsive | Avg. Time Until Breathing & Heart Beat Not Detected | Mortality Rate | Number of Toads Tested | Length of Trial | Side effects | Comments |
|---|---|---|---|---|---|---|---|---|---|---|
| 2-Phenoxyethanol + Eugenol 1:1 | Ethanol | 42.1 g/L 29.5 g/L | 2 Ventral + dorsal | 19.16 mins | 24.17 mins | 100% | 6 | 48 hrs | Bloating, Ventral redness Bloating, Ventral pinkness | |

The claims defining the invention are as follows:

1. A method of humanely controlling an invasive amphibian population comprising applying to at least one member of said population a non-aqueous or substantially non-aqueous formulation comprising 2-phenoxyethanol at a concentration greater than 40 g/L, and a carrier selected from ethanol and/or isopropanol, wherein the member of said amphibian population becomes unresponsive about 15 minutes after application of the formulation.

2. The method according to claim 1, wherein the concentration of 2-phenoxyethanol is from about 40 g/L to about 200 g/L.

3. The method according to claim 1, wherein the concentration of 2-phenoxyethanol is from about 50 g/L to about 200 g/L.

4. The method according to claim 1, wherein the concentration of 2-phenoxyethanol is from about 60 g/L to about 200 g/L.

5. The method according to claim 1, wherein the concentration of 2-phenoxyethanol is from about 70 g/L to about 200 g/L.

6. The method according to claim 1, wherein the concentration of 2-phenoxyethanol is from about 80 g/L to about 200 g/L.

7. The method according to claim 1, wherein the carrier is ethanol.

8. The method according to claim 1, wherein the invasive amphibian population is a population of toads.

9. The method according to claim 1, wherein the invasive amphibian population is a population of cane toads (*Rhinella marina*).

10. A non-aqueous or substantially non-aqueous formulation consisting essentially of 2-phenoxyethanol at a concentration greater than 40 g/L, eugenol, and a carrier selected from ethanol and/or isopropanol.

11. The formulation according to claim 10, wherein the concentration of 2-phenoxyethanol is from about 40 g/L to about 200 g/L.

12. A method of humanely controlling an invasive amphibian population comprising applying to at least one member of said population a non-aqueous or substantially non-aqueous formulation comprising 2-phenoxyethanol at a concentration greater than 40 g/L, eugenol, and a carrier selected from ethanol and/or isopropanol, wherein the application achieves unresponsiveness about 15 minutes from application of the formulation to individual members of the amphibian population.

13. The method according to claim 12, wherein the concentration of 2-phenoxyethanol is from about 40 g/L to about 200 g/L.

* * * * *